J. R. WILLIAMS & H. W. & B. BRADLEY.
OBTAINING ZINC AND/OR COPPER FROM COMPLEX ORES OR THE LIKE.
APPLICATION FILED AUG. 9, 1909.
1,006,330.
Patented Oct. 17, 1911.
2 SHEETS—SHEET 2.
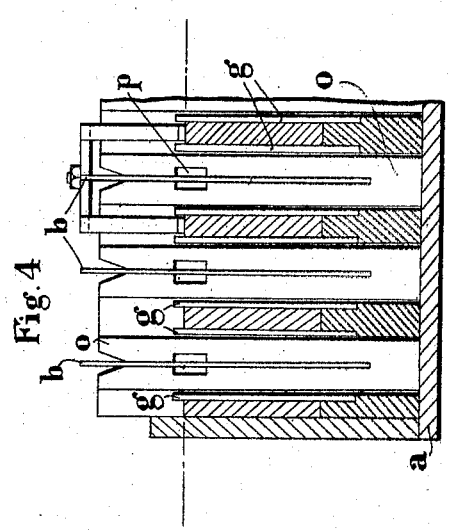
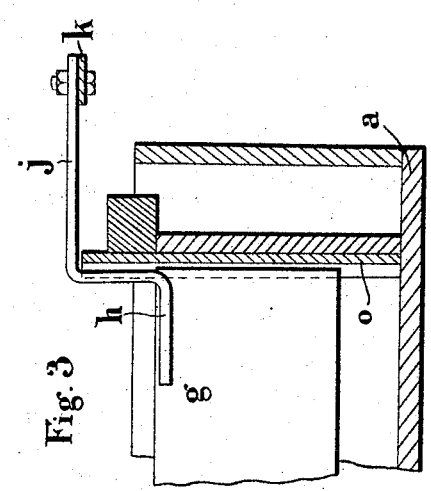

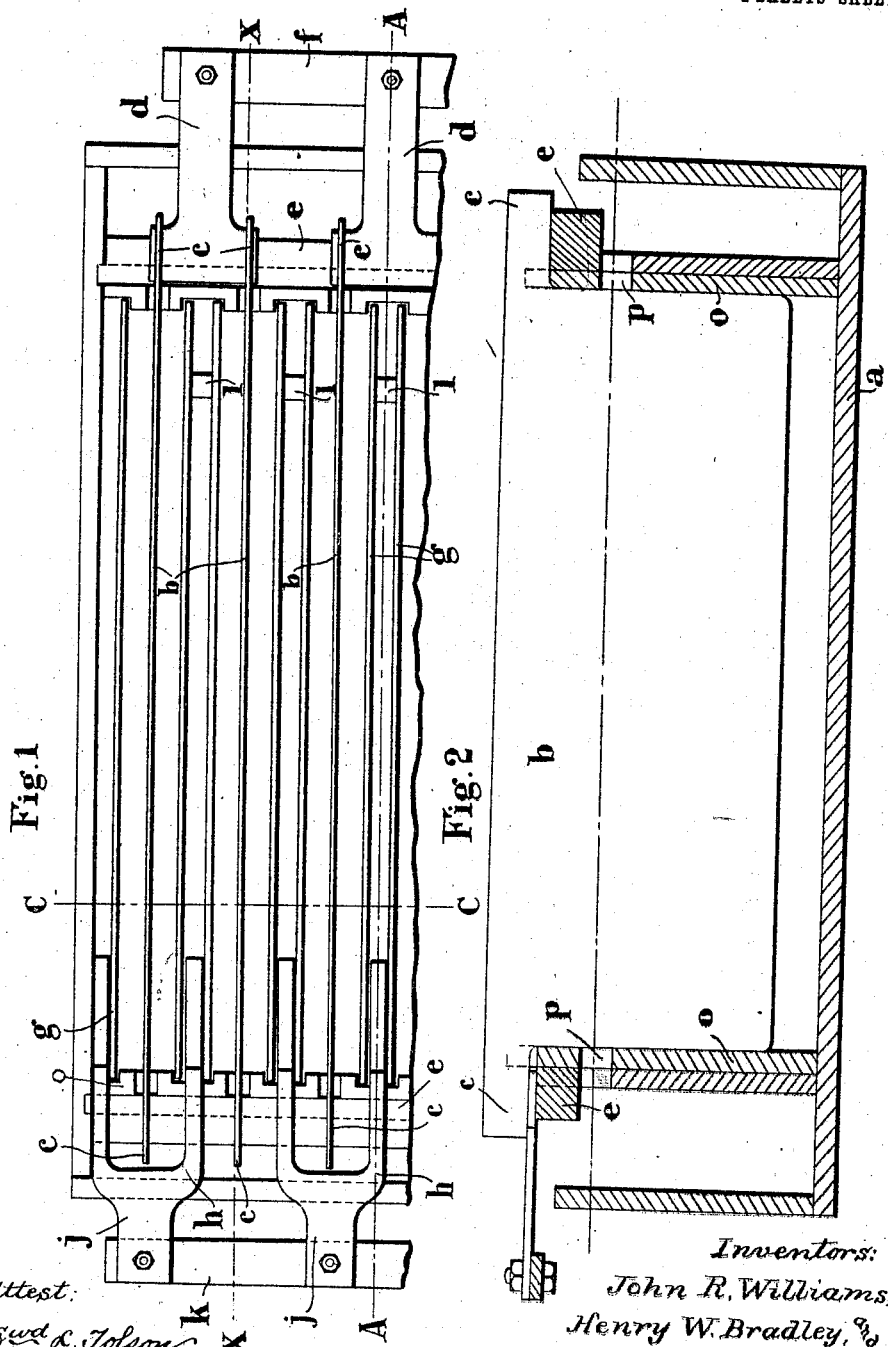

UNITED STATES PATENT OFFICE.

JOHN R. WILLIAMS, HENRY W. BRADLEY, AND BENJAMIN BRADLEY, OF SHEFFIELD, ENGLAND.

OBTAINING ZINC AND/OR COPPER FROM COMPLEX ORES OR THE LIKE.

1,006,330. Specification of Letters Patent. Patented Oct. 17, 1911.

Application filed August 9, 1909. Serial No. 511,973.

*To all whom it may concern:*

Be it known that we, JOHN RICHARD WILLIAMS, HENRY WENTWORTH BRADLEY, and BENJAMIN BRADLEY, all subjects of the King of Great Britain and Ireland, and residing at The Woods, Grenoside, Sheffield, in the county of York, England, have invented certain new and useful Improvements in Obtaining Zinc and/or Copper from Complex Ores or the Like, of which the following is a specification.

Our invention relates to obtaining zinc and/or copper from complex ores and the like.

The object of the present invention is to obtain the zinc and/or copper from ores and the like in which zinc or copper or zinc and copper occurs mixed with lead and/or other metals from which it is not easily obtainable either for the reason that it is mixed with lead or other metals or because of the large proportion of silicates or iron contained in the ores. For instance with many ores containing silicates if leaching be attempted the action of sulfuric acid produces a gelatinous mass rendering percolation and therefore separation impossible.

This invention consists in the separation of zinc and/or copper from silicate containing ores consisting in subjecting the same to the action of a very dilute solution of sulfuric acid.

The invention also consists in separating the zinc and/or copper from the other materials in the ore to be treated by leaching with a slightly acid solution of zinc or copper sulfate preferably of low concentration but of such strength that substantially the zinc or copper alone is dissolved out and may then be recovered by electric deposition.

The invention further consists in a continuous process for the extraction of zinc and/or copper in which the ore or the like is first leached with a slightly acid solution of zinc or copper sulfate, the solution being then run off and the metal deposited electrolytically while the solution after electrolysis is returned to the leaching vessels and used again in the process.

The invention also consists in the method of extracting zinc hereinafter described.

By means of our invention the zinc can be extracted from ores which have heretofore not been treated commercially such for instance as ore containing from 5 to 15 per cent. of zinc mixed with lead and other substances.

By the use of a solution of zinc sulfate which is only slightly acid the formation of a gelatinous mass is practically avoided; also by the use of a solution of zinc sulfate the presence of a sufficient percentage of zinc to render electrolytic deposition economical is insured. The limiting percentage strength of sulfuric acid is determined by the risk of precipitation of gelatinous silica in ores containing combined silica in the leaching on the one hand and by the risk of dissolution of the iron cathodes when such are used in the electrodeposition on the other hand. By using a slightly acid solution for the leaching of silicate containing ores one batch may be leached many times by the same solution regenerated in each case by electrolysis and a correspondingly large proportion of the metal contents extracted before such a quantity of gelatinous silica accumulates as to prevent percolation which would result from the first or a very early treatment were a substantially acid solution used. Indeed with our process the same solution may be used for many batches of ore. Even in ores not containing silicates the economical operation of the process favors a weakly acid solution and with a high current density in order to maintain such concentration a rapid flow of electrolyte in the cell is required; the deposition of impurities resulting from a slow flow being thereby also avoided. As regards the factor of gelatinization a 2 per cent. acid concentration may safely be employed, but as regards the dissolution of the cathode the limit is as low as .5 per cent. concentration, and for this reason in the case where the solution first leaches out the zinc and is then subjected to electrolysis an acid of .3 per cent. concentration is a very suitable strength. Further in the circulatory process according to our invention the sulfuric acid in the solution used is regenerated and the solution of the electrolytic cell may therefore be used over again, the sulfuric acid not being lost except, of course, such small losses as inevitably occur in a process of this type.

In carrying the invention into effect according to one example we place the crushed ore which has been subjected to any necessary preparatory treatment as for example roasting in the case of sulfid ores in a leaching vessel of suitable type. A solution of zinc sulfate formed by dissolving the sulfate of zinc and made acid by treatment in an electrolytic bath or by direct addition of acid, is poured into the leaching vessel and after acting on the ore for the desired time passes out through a pipe at the bottom of the vessel or by decantation into the electrolytic cell. The zinc sulfate may be formed by treating the ore itself with acid.

An electrolytic cell particularly applicable to the extraction of metal from the solution is shown in the accompanying drawings in which—

Figure 1 shows the cell in plan, Fig. 2 in sectional elevation on X—X of Fig. 1. Fig. 3 in sectional elevation on A—A of Fig. 1, and Fig. 4 in sectional elevation on C—C of Fig. 1.

This form consists of a number of electrodes which are arranged vertically parallel in a large box, $a$, which forms the cell. The cathodes, $b$, are formed with lugs, $c$ at their ends adapted to rest on supporting pieces, $e$, extending the whole width of the box and dividing off spaces at the two ends of the box, the liquid being admitted into one of these spaces and withdrawn from the other. At one end each cathode rests on a plate of lead $d$ situated above the surface of the liquid, the several plates being connected up to bus-bars $f$ outside the cell. The cathodes may be made of iron, preferably tempered and galvanized, and the anodes of lead plates. The anodes $g$ are placed one on each side of each cathode so that both surfaces of the cathode are operative. The anodes are mounted in pairs, being soldered or otherwise connected one on each side of the prongs $h$ of fork-shaped pieces $j$ whose outer ends are attached to bus-bars $k$ the prongs of the fork-shaped pieces serving as distance pieces to separate a pair of anodes. Further distance pieces $l$ are provided at the end of the anode farthest from the fork and intermediate distance pieces may also be provided if desired. Each adjacent pair of anodes is supported from the prong of the fork and the distance pieces between the two anodes of the pair on wooden rails extending across the electrolytic cell and resting on rails which lie along the bottom of the cell. The anodes may be protected all around their edges at the top by means of wooden rails grooved to receive the top edges of each pair of anodes, and at the bottom by suitable covering pieces. The side edges of the anodes fit into vertical rails $o$ grooved to receive them and between the vertical rails at their upper ends are formed inclined surfaces to guide the cathodes $b$ into their correct position, and at the water level holes $p$ are made for the circulation of the liquid. The electrolyte is introduced into the space at either end of the box, and the liquid passes longitudinally along the electrodes and out into the space at the other end of the cell and so to the outlet.

The object of the double anode $g$ $g$ above described the two parts being separated by a wooden rail, is to obtain mechanical strength and avoid the alterations of distance between the cathode and anode which would be caused by the wasting away of a thick electrode where mechanical strength is obtained by thickness of metal. It will be seen further that in the cell above described all the parts contained in the main box $a$ forming the cell are loose and may be readily lifted out when it is desired to clean the cell, it being thus possible readily to flush the cell or shovel out the deposit or otherwise remove it. When the various parts are in position it will be seen that the cell really consists of a number of practically separate cells parallel to each other. When the cell is in operation it is found that the deposit of zinc is uniform this being assisted by the small distance between the plates and the closed-in form of the spaces between the anodes and the considerable mechanical agitation caused by the escaping gas formed during electrolysis.

The solution used may contain 5 per cent. or more of neutral zinc sulfate of the composition $ZnSO_4.7H_2O$. It is desirable to use a solution of about 6 per cent. to 8 per cent. strength the amount of zinc precipitated from a solution of greater concentration per ampere hour substantially not increasing whereas the proportionate loss of zinc solution in the extracted ore is much greater. With solutions of lesser concentration the efficiency of the electrolysis is greatly impaired. For example in a series of experiments in which the current was passed at the same voltage through identical cells containing solution varying in strength of from 1% of neutral zinc sulfate to 16% of zinc sulfate, an equal rate of deposition (about 17 grains per ampere hour) was observed from 16% down to 5% but below this concentration the rate of deposition was found to be materially decreased. These experiments repeated with the same solutions containing an addition of 0.3% of sulfuric acid gave practically identical results. It is found that if the current density does not exceed 11 amperes per square foot of lead surface exposed the anodes may run continuously for 300 days without renewal. It is preferable, to work with a current density of about 10 amperes per square foot of surface. The electrolyte, we find, as it comes from the cell, possesses greater activity when used for extracting zinc from ore than would be expected from the quantity of acid contained. We find it preferable to begin the electrolytic process with a neutral solution.

Another form of electrolytic cell which is suitable for use in the present process is provided with an anode formed preferably of a lead plate, although carbon may be used. The cathode may also be in the form of a plate, and in such a case a channel is cut in the wall of the cell adapted to receive the edges of the plate, leaving however, a space full of electrolyte between the plate and the wall of the channel. The effect of protecting the edges of the plate in this way is that growths are prevented on its edges when high current densities are used. The anode should at the same time be placed at such a distance from the cathode that formation of irregular growths on the surface of the plate is avoided.

We find that in a cell constructed as above described a considerable current density per square foot of surface can be used and a sufficiently uniform smooth deposit still obtained.

When a sufficient quantity of zinc has been deposited in the cell on galvanized iron cathodes, the said cathodes are removed and the zinc stripped or melted off them by dipping into a bath of molten zinc or it may be removed in any convenient manner, or if the cathodes are of zinc the whole may be melted down.

In the above described process the slightly acid sulfate of zinc solution dissolves out the zinc from the ore and then passes into the electrolytic cell where zinc is deposited on the cathode and sulfuric acid formed so that a slightly acid solution may continually be passed through the apparatus.

It will be obvious that other forms of electrolytic cell than that above described may be used for carrying out the process, the essential features of the invention being the use of a slightly acid and a more or less dilute solution of zinc sulfate containing such a low percentage of acid that it acts principally on the zinc or zinc and copper leaving lead but little attacked and does not gelatinize the mass so that the acid used in the leaching bath is restored in the electrolytic cell and can be employed again in a continuous process if so desired.

Whereas this process has been described as applicable to the extraction of zinc it may be equally applied in the extraction of ores containing copper either as silicate or in other combinations in which case the zinc sulfate solution is replaced by copper sulfate the other general features remaining unaltered. Where zinc and copper occur together it will be evident that these may be leached out together and recovered separately by electrodeposition the separation being effected by a suitable arrangement of the electrical conditions in the vat.

Having now described our invention what we claim and desire to secure by Letters Patent is:—

1. A continuous process for the extraction of zinc, copper or both from ores including leaching the same with a solution of sulfate of one or both of these metals of low concentration containing a small percentage of free sulfuric acid, electrolyzing the liquor to remove only enough metal to regenerate the solution of low acidity and of substantially the original composition and then employing it for further leaching; as and for the purposes set forth.

2. A process for the extraction of zinc from ores, including leaching the same with a solution of zinc sulfate containing about 8% of the metallic sulfate and about 0.3% of free sulfuric acid, electrodepositing a portion of the metal substantially equivalent to the amount extracted from the ore and employing the solution for the further leaching, as set forth.

3. A process for the extraction of metals of the zinc and copper group from silicate containing ores consisting in leaching the same with a solution of the sulfate of the predominating metal of the group of low concentration containing a small proportion of free sulfuric acid recovering a portion of the metal substantially equivalent to the amount extracted and employing the solution for further leaching; as set forth.

4. A process for the extraction of zinc, copper or both from ores consisting in leaching the same with a solution of the sulfate of one or both of these metals of low concentration, containing a small proportion of free sulfuric acid and recovering a portion of the metal sufficient to regenerate this solution by passage of the liquor in a relatively thin film at high speed between an anode surface and a cathode surface in an electrolytic cell; as set forth.

5. A process for the extraction of zinc, copper or both including leaching the ore with a dilute solution of sulfuric acid until the acid is exhausted, reacidifying the solution to substantially its initial concentration and repeating the operation until a solution containing a substantial quantity of metallic sulfate is formed, electrolyzing the solution removing therefrom sufficient metal to reproduce a solution of the initial acidity and employing this for further leaching; as set forth.

6. A process for the extraction of metals of the zinc and copper group from silicate containing ores consisting in leaching the same with a solution of the sulfate of a metal of the group of low concentration containing a small proportion of free sulfuric acid recovering the metal by passage of the solution in a relatively thin film at high speed between an anode surface and a cathode surface in an electrolytic cell; as set forth.

7. A process for the extraction of metals of the zinc and copper group from silicate containing ores consisting in leaching the ore with a dilute solution of sulfuric acid until the latter is exhausted, withdrawing the solution reacidifying the same to substantially its initial concentration, returning this to act upon the ore and repeating the series of operations until the solution contains a substantial quantity of metallic sulfate, electrolyzing the solution and removing by electrodeposition such a quantity of the metal as to reproduce a solution of substantially the initial acidity and returning the same to the leaching vessels; as set forth.

In testimony whereof, we affix our signatures in presence of two witnesses.

JOHN R. WILLIAMS.
H. W. BRADLEY.
BEN. BRADLEY.

Witnesses:
ALBERT E. PARKER,
BERTRAM H. MATTHEWS.